Patented July 27, 1948

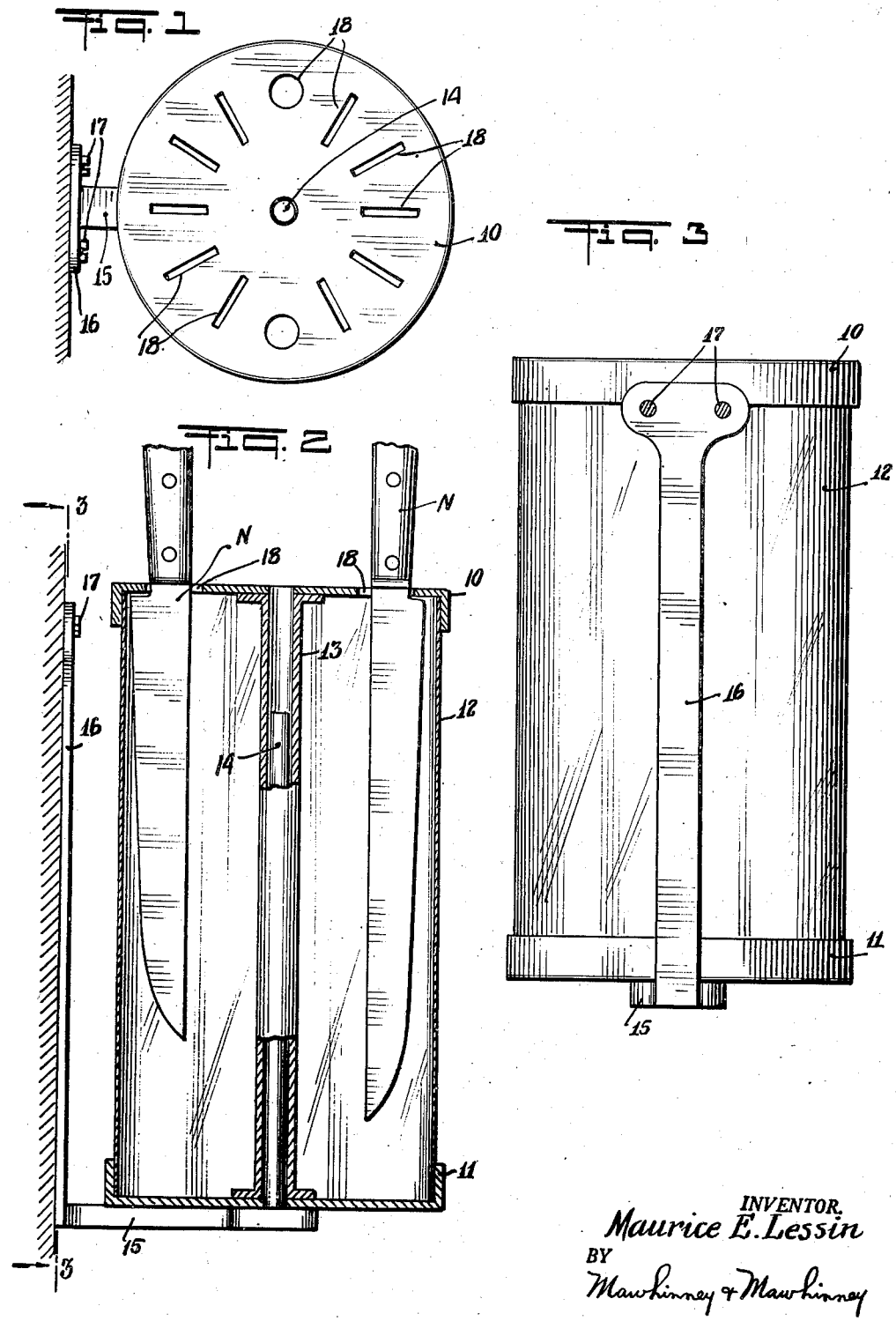

2,446,016

UNITED STATES PATENT OFFICE 2,446,016

KNIFE RACK

Maurice E. Lessin, Bronx, N. Y.

Application June 30, 1945, Serial No. 602,563

3 Claims. (Cl. 211—60)

The present invention relates to improvements in knife racks and more particularly refers to a holder for supporting a number of different sizes and types of knives for convenience of use in a kitchen or other locality where quick accessibility of a variety of knives for different uses is a requirement.

An object of the invention is to provide an improved holder of this character which will be both sanitary and compact in that the knives are encased and in a circular arrangement with the handles of the knives grouped for quick selection and withdrawal.

A further object of the invention resides in providing an improved knife case in the nature of a rack with the handles protruding in position to be readily grasped and withdrawn, and wherein the blades of the knives are encased for protection and sanitation with the wall of the case transparent to permit of visual examination and spotting of the knives as to size, shape and adaptability for certain kitchen purposes.

A still further object of the invention is to provide a rotary demountable holder and bracket for supporting a knife rack of the above character and in the production of a rack of a simple and economical form which will be sturdy and of long life in the use to which normally subjected.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved knife rack constructed in accordance with the present invention, Figure 2 is a vertical section taken through the same and showing knives, with portions of their handles broken away, in a position of repose in the rack, and Figure 3 is an elevation of the rack and its support with parts shown in section.

Referring more particularly to the drawings, 10 and 11 designate top and bottom flanged discs respectively of wood, plastics or other appropriate material which are brought together upon a cylindrical or other tubular wall 12 of the rack, which constitutes with such discs or heads 10 and 11 an enclosed rack space for the knives or other implements having handles N which are wider than the blades thereof.

Centrally of the rack or receptacle is a flanged tube 13, the flanges of which abut against central perforated portions of the heads 10 and 11; the tube flanges may be welded, soldered, brazed, or otherwise affixed to the discs 10 and 11, the tube 13 and its flanges being also preferably of metal. Thus the tube 13 and the centrally perforated heads 10 and 11 constitute a through opening in the central portion of the rack which does not communicate with the interior space of the rack.

As best viewed in Figure 2 the head 10 may be retained in place by reason of the frictional gripping of the transparent casing wall 12 outwardly against the downwardly depending flanges of the head 10, thus not requiring the permanent affixation of the head in place. This particular construction will permit the removal of the head 10 for purposes of cleaning the interior of the receptacle and removing any foreign matter which may have fallen from the knife blades.

From an inspection of Figure 2 it will be clear that both internal and external diameter of tube 13 are greatly inferior to the internal diameter of the rack wall 12 so that the circumambient space confined within the transparent casing wall 12 and externally of the tube 13 is comparatively great to afford ample room for receiving wide knife blades and the like.

The bore of tube 13 serves to receive a spindle or shaft 14 upstanding from an arm 15 carried by a bracket 16 affixed, as by the fastening 17, to a wall or like support.

In the head 10 of the rack are radial or other slots 18 of a radial depth to receive all knife blades of a class for which the rack will be used but these slots 18 are narrower than the handles N of the knives or other implements to prevent such knives from dropping through the slots 18. In other words the knives N are supported by the wider portions of their handles N resting upon head 10 at the sides of the slots 18.

As shown in Figure 1 some of the slots 18 may be circular or other forms to receive ice picks or other implements having handles which are wider than the diameters of such circular slots.

In the use of the device knives are upended above the device and introduced by their blade ends through the slots 18 until the vertical descending movement is arrested by the handles N. These knives rest in the device in the manner indicated in Figure 2 wherein the entire blade is housed within the device and the handles N alone project upwardly, preferably in a circular group.

Such circular group is mathematically the most compact form.

At the same time viewing Figure 1 the radial arrangement particularly of the narrow slots 18, shows that in the circular arrangement the spaces between slots are greatly wider at their outer circumferential ends so as to give ample space to approach any particular knife handle from the outside. For this purpose the holder is rotatable around the spindle 14 whereby to bring any particular selected knife handle N to a position opposite the hand of the user whereby such hand may approach the handle from a radially outward direction, taking advantage of the wider outer circumferential spaces referred to.

All of the blades may be readily viewed in an ensemble and at one glance in the circular closely grouped arrangement through the symmetrical transparent wall 12 whereby a particular knife may be instantaneously spotted, the container quickly rotated by hand to bring the handle of that knife to a correct position whereby the knife may be withdrawn quickly after giving immediate access to the same. The handles may be restored with like facility.

The slots 18 and particularly the circular slots afford circulation of air through the device so that it may be at times used as a drying rack.

The wall 12 may be suitably held to the flanges of the heads 10 and 11 by Cellophane cement and the material of the wall 12 may also be of Cellophane if desired. The tube 13 is open from end to end to facilitate cleaning and to prevent accumulations of foreign material which would otherwise clog a closed end tube to prevent the spindle 14 from fully entering the bore thereof. The arm 15 will be of sufficient length comparatively to the diameter of the rack to hold the same away from the bracket 16 and kitchen wall whereby it may be free to rotate. The rack container can at any time be lifted off the spindle 14.

It will be noted that the spindle 14 is vertically long to penetrate a major portion of the tube 13 which gives greater bearing surface between the parts 13 and 14, prevents wobbling or eccentric behavior of the rack in rotating and also prevents the rack from becoming accidentally detached from the bracket as might be the case with a shorter spindle.

It is obvious that various changes and modifications may be made in the details of construction and design of the above specifically described embodiment of this invention without departing from the spirit thereof, such changes and modifications being restricted only by the scope of the following claims:

What is claimed is:

1. A knife rack comprising a vertical wall bracket, a horizontal member connected to the lower end of said vertical bracket, a vertical spindle affixed to said horizontal member, a cylindrical receptacle comprising a base member, a top member having radially elongated slots therethrough, a transparent cylindrical wall separating said base and said top members, a tubular member centrally located in said cylindrical receptacle having flanges at opposite ends engaging the top and base members, and having a diameter in excess of said outside diameter of said spindle and slidably and rotatably mounted thereover.

2. A knife rack comprising a transparent enclosing wall of tubular form, base and top heads fitted against the upper and lower ends of said tubular transparent wall and having mutually directed flanges frictionally engaging side portions of the wall by which said heads are attached to said wall to form an enclosed receptacle, said top head having a series of slots circularly distributed around the center portion thereof wide enough to receive the blades of knives downwardly therethrough visible through said transparent wall, said slots being narrower than the handles of the knives whereby to support the knives on said top head with the handles projecting upwardly in readiness to be withdrawn, said top and bottom heads also having substantially vertical perforations in substantial vertical alignment and a tube centrally located within said receptacle having horizontal flanges at its ends abutting said top and bottom heads respectively of the internal passage of the tube registering with the perforations of said heads, and means for supporting said receptacle having an upstanding spindle adapted to enter the tube on which the receptacle may be rotated.

3. For use with a substantially horizontal support and a spindle upstanding therefrom, an improved knife receptacle comprising a tubular transparent wall, a top head frictionally engaging the top portion of said tubular transparent wall, a bottom head fitted against the bottom portion of said transparent wall and affixed thereto, said top head having a series of radially arranged slots of widths to receive therethrough the blades of knives viewable through the transparent wall but narrower than the handles of the knives whereby to support the knives on the top head with the handles projecting upwardly from said top head, said bottom head having a substantial circular perforation and a tube within said wall having a horizontal flange affixed to said bottom head with internal passage registering with said perforation to slidably and rotatably receive the spindle on which the receptacle may be rotated.

MAURICE E. LESSIN.

REFERENCES CITED

The following references are of record in the file of this patent:

UNITED STATES PATENTS

| Number | Name | Date |
| --- | --- | --- |
| 173,816 | Rising | Feb. 22, 1876 |
| 228,998 | Johnston | June 22, 1880 |
| 291,704 | Felch | Jan. 8, 1884 |
| 1,346,909 | Onufryk | July 20, 1920 |
| 1,409,701 | Giles | Mar. 14, 1922 |
| 2,238,324 | Hopkins | Apr. 15, 1941 |
| 2,338,303 | Rosenberg | Jan. 4, 1944 |